(12) United States Patent
Toyoda

(10) Patent No.: US 7,708,098 B2
(45) Date of Patent: May 4, 2010

(54) BRAKE SUPPORT STRUCTURE

(75) Inventor: Hidetoshi Toyoda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 330 days.

(21) Appl. No.: 11/708,607

(22) Filed: Feb. 21, 2007

(65) Prior Publication Data

US 2007/0199757 A1 Aug. 30, 2007

(30) Foreign Application Priority Data

Feb. 24, 2006 (JP) ............................ 2006-048899

(51) Int. Cl.
 *B62K 25/08* (2006.01)
 *B60T 8/32* (2006.01)
(52) U.S. Cl. .................. 180/219; 180/227; 303/137
(58) Field of Classification Search ............. 180/227, 180/219; 280/284; 303/137
 See application file for complete search history.

(56) References Cited

U.S. PATENT DOCUMENTS

| 2,183,371 | A | * | 12/1939 | Stromberg | 303/8 |
|---|---|---|---|---|---|
| 3,851,672 | A | * | 12/1974 | De Vincent et al. | 138/106 |
| 4,353,578 | A | * | 10/1982 | Knapp | 280/781 |
| 4,392,536 | A | * | 7/1983 | Iwai et al. | 180/217 |
| 4,482,135 | A | * | 11/1984 | Ishida et al. | 267/220 |
| 4,702,339 | A | * | 10/1987 | Hayashi et al. | 180/219 |
| 4,742,884 | A | * | 5/1988 | Ishikawa | 180/219 |
| 5,377,776 | A | * | 1/1995 | Saiki | 180/219 |
| 5,419,625 | A | * | 5/1995 | Iwase et al. | 303/116.1 |
| 6,336,328 | B1 | * | 1/2002 | Inami et al. | 60/585 |
| 6,371,236 | B1 | * | 4/2002 | Fukunaga | 180/219 |
| 6,516,909 | B2 | * | 2/2003 | Gogo | 180/219 |
| 6,905,137 | B2 | * | 6/2005 | Fowler et al. | 280/781 |
| 6,907,732 | B2 | * | 6/2005 | Masuda et al. | 60/585 |
| 7,350,881 | B2 | * | 4/2008 | Asahi | 303/137 |
| 2006/0151226 | A1 | * | 7/2006 | Misaki et al. | 180/227 |
| 2007/0176393 | A1 | * | 8/2007 | Toyoda et al. | 280/286 |
| 2007/0228684 | A1 | * | 10/2007 | Bowers | 280/124.134 |

FOREIGN PATENT DOCUMENTS

| EP | 1 486 411 A2 | 12/2004 |
|---|---|---|
| EP | 1514790 A2 * | 3/2005 |
| EP | 1826086 A1 * | 8/2007 |
| JP | 7-144676 A | 6/1995 |
| JP | 2002-87364 A | 3/2002 |

* cited by examiner

*Primary Examiner*—Tony H. Winner
(74) *Attorney, Agent, or Firm*—Birch, Stewart, Kolasch & Birch, LLP

(57) ABSTRACT

A brake support structure for effectively utilizes a space is disposed so as to be hardly visible in appearance. In addition, the brake support structure protects the pipes. A brake support structure includes a vehicle frame having rear frames extending from main frames with a swing arm having a front end pivotally supported on the rear frames and a rear end for rotatably supporting a rear wheel. Brake pipes are connected to a brake caliper for braking the rear wheel. An upper cross member interconnects the rear frames and is disposed near the swing arm. The brake pipes extend between the upper cross member and the swing arm.

18 Claims, 6 Drawing Sheets

BRAKE SUPPORT STRUCTURE

CROSS-REFERENCE TO RELATED APPLICATIONS

The present application claims priority under 35 USC 119 to Japanese Patent Application No. 2006-048899 filed on Feb. 24, 2006 the entire contents of which are hereby incorporated by reference.

BACKGROUND OF THE INVENTION

1. Field of the Invention

The present invention relates to a brake support structure for braking wheels of a two-wheeled vehicle. More particularly, to a brake support structure for supporting a brake pipe for supplying a brake fluid.

2. Description of Background Art

A brake support structure is known in related art wherein a rear brake pipe extends from a rear brake caliper and is disposed on an upper surface of a swing arm that turns 180 degrees around over a pivot shaft and is coupled to a rear brake master cylinder. See, for example, Japanese Patent Laid-open No. Hei 7-144676.

However, Japanese Patent Laid-open No. Hei 7-144676 suffers the following two problems:

The first problem relates to the layout of the brake pipe near the pivot shaft, the brake pipe is required to have a certain curvature or greater because of the need for the absorption of vibrations of the swing arm. However, it is difficult to provide a space for the curvature around the pivot shaft.

The second problem is that the need for a separate stay for the pipe results in disadvantages as to cost and weight.

SUMMARY AND OBJECTS OF THE INVENTION

It is an object of an embodiment of the present invention to solve the above problems. A brake support structure is provided for effectively utilizes a space and for being disposed so as to hardly be visible in appearance. In addition, the brake support structure protects pipes.

To achieve the above object in accordance with an embodiment of the invention, a brake support structure is provided that includes a vehicle frame having main frames extending rearwardly and downwardly from a head pipe and a plurality of rear frames extending from the main frames. A swing arm includes a front end pivotally supported on the rear frames and a rear end by which a rear wheel is rotatably supported. Brake pipes are connected to a brake caliper for braking the rear wheel with a cross member interconnecting the rear frames being disposed near the swing arm. The brake pipes extend between the cross member and the swing arm.

According to an embodiment of the present invention, a seat rail extending from a rear upper portion of the vehicle frame and a seat stay extending rearwardly from a rear lower portion of the vehicle frame are connected to the vehicle frame, the cross member and the swing arm are disposed between the seat rail and the seat stay. The brake pipes are supported on the cross member.

According to an embodiment of the present invention, the rear frames have a central frame disposed centrally of the vehicle frame and side frames disposed in a sandwiching relation to the central frame. A drive force transmitting unit, for transmitting the drive force from an engine to the rear wheel, is disposed in a first space defined between one of the side frames and the central frame. The swing arm has a front end pivotally supported in a second space defined between the other of the side frames and the central frame, and the brake pipes are disposed in the second space.

According to an embodiment of the present invention, a brake pipe support member is provided on the brake pipes with the brake pipe support member being supported on a rear portion of the cross member and the brake pipes being supported forwardly of the brake pipe support member.

With the brake support structure according to an embodiment of the present invention, the cross member interconnecting the rear frames is disposed near the swing arm. The brake pipes connected to the brake caliper for braking the rear wheel extend between the cross member and the swing arm. Therefore, the dead space between the cross member and the swing arm is effectively utilized, allowing the brake piping to be easily placed around the pivot shaft and to have a layout for a neat appearance and piping protection. The brake support structure is advantageous as to cost and weight because there is no need for the installation of the separate pipe stay in the past.

With the brake support structure according to an embodiment of the present invention, since the cross member and the swing arm can be positioned closely to each other, brackets for supporting the brake pipes are not required to be large in size. Therefore, the brake support structure is advantageous as to cost and allows the vehicle to be lightweight as a whole.

With the brake support structure according to an embodiment of the present invention, the drive force transmitting unit is disposed in a first space between one of the side frames and the central frame. The brake pipes are disposed in a second space A2 between the other of the side frames and the central frame. Consequently, the brake pipes can be fixed in place in the space opposite to the drive force transmitting unit. These pipes can thus be fixed with ease.

With the brake support structure according to an embodiment of the present invention, inasmuch as the process of supporting the brake pipe support member on the cross member is performed in the space opposite to the engine, the process can be carried out without physical interference with accessories mounted on the engine. In addition, as the brake pipes are supported forwardly of the brake pipe support member, the brake pipes are prevented from projecting rearwardly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A preferred embodiment of a brake support structure according to the present invention will be described in detail below with reference to the drawings.

FIGS. 1 through 6 show an embodiment of the present invention. In the description, the terms "front," "rear," "right," and "left" refer to directions as viewed from the rider on the two-wheeled motor vehicle.

Figure 1:
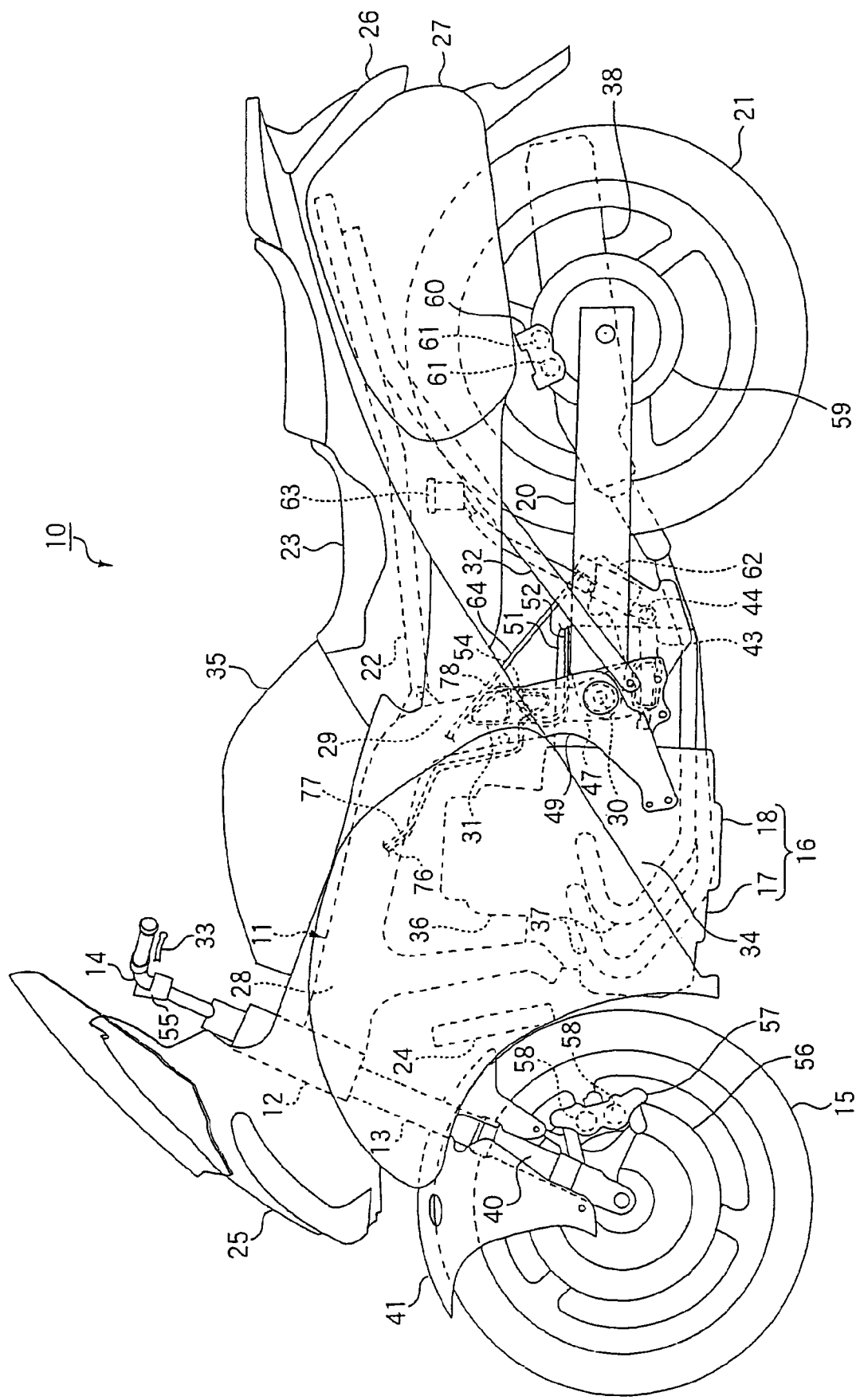
FIG. 1 is a left side elevational view of a two-wheeled motor vehicle incorporating a brake support structure according to the present invention.
Figure 2:
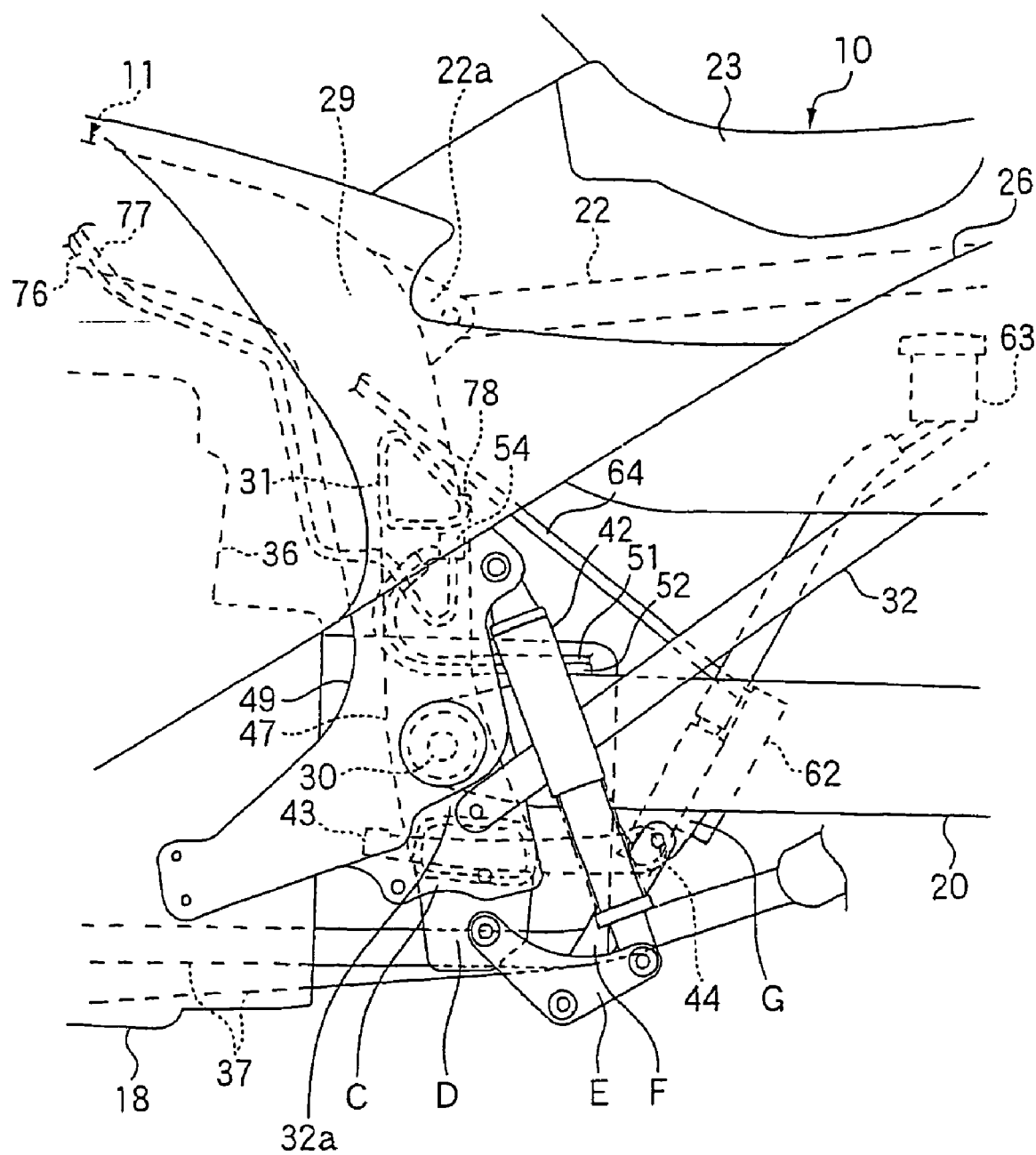
FIG. 2 is an enlarged view of an essential portion of the two-wheeled motor vehicle shown in FIG. 1.
Figure 3:
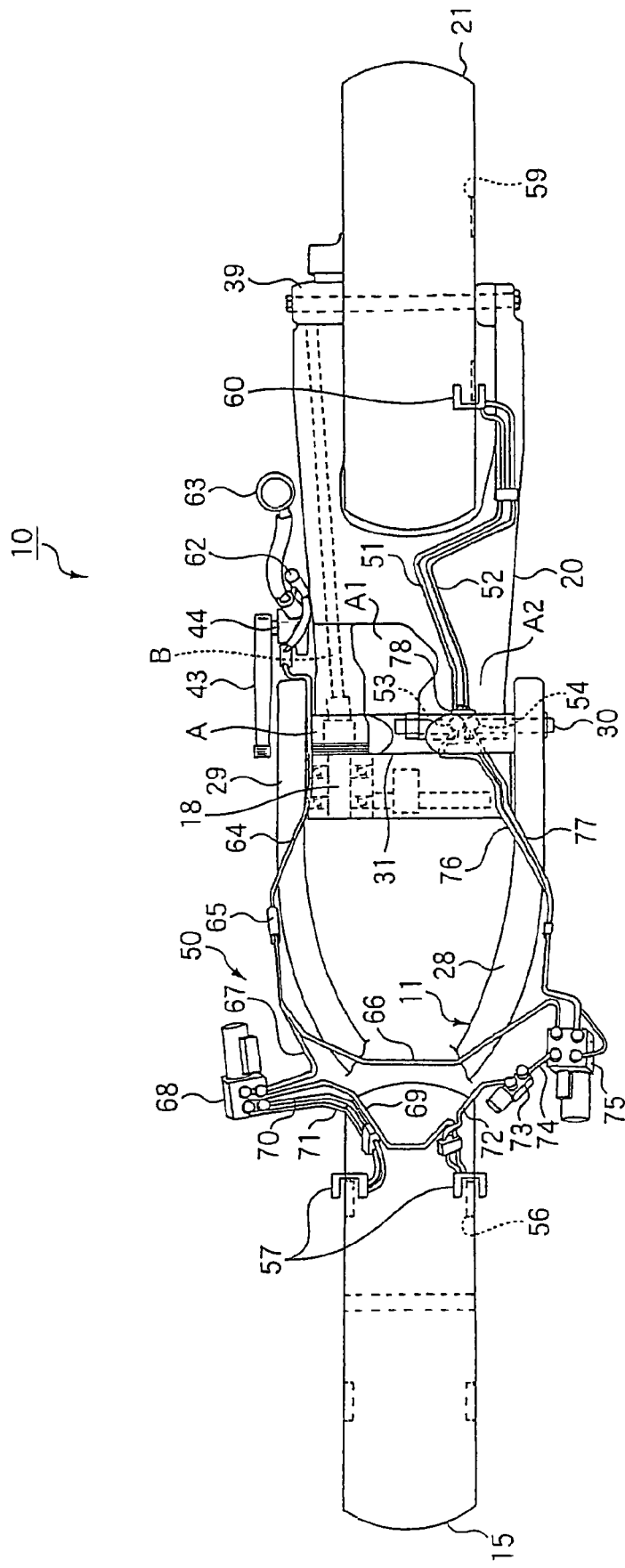
FIG. 3 is a plan view illustrating a brake pipe layout of the two-wheeled motor vehicle shown in FIG. 1.

As shown in FIGS. 1, 2, and 3, the two-wheeled motor vehicle 10 mainly includes a vehicle frame 11 with a front fork 13 attached to a head pipe 12 on a front end of the vehicle frame 11 and a handle 14 coupled to an upper portion of the front fork 13. A front wheel 15 is rotatably mounted on a lower portion of the front fork 13. A power unit 16 including an engine 17 is mounted on a front lower portion of the vehicle frame 11 with a transmission 18, a drive shaft B, and gears in a final drive gear case 39. A swing arm 20 is mounted on a rear lower portion of the vehicle frame 11 for housing the drive shaft B therein. A rear wheel 21 is rotatably mounted on a rear end of the swing arm 20 with a tandem seat 23 being mounted in place by a seat rail 22 extending from a rear upper portion of the vehicle frame 11. The two-wheeled motor vehicle 10 is a shaft-drive vehicle wherein the power is transmitted through the transmission 18, the drive shaft B, and the final drive gears to drive the rear wheel 21. The drive shaft B is disposed in a boot A interposed between the transmission 18 and the swing arm 20.

The two-wheeled motor vehicle 10 also includes a radiator 24 disposed in a front lower portion of the vehicle frame 11. A front cowl 25 covers front and front side portions of the vehicle frame 11 with a rear cowl 26 covering rear and rear side portions of the vehicle frame 11. A saddle bag 27 is disposed on a side of the rear cowl 26. The front cowl 25, the rear cowl 26, and the saddle bag 27 are made of synthetic resin.

The vehicle frame 11 is cast of an aluminum alloy, for example, to a substantially inverted U-shape. The vehicle frame 11 includes a pair of left and right main frames 28 extending rearwardly and downwardly from the head pipe 12 with a plurality of rear frames 29 on rear lower portions of the main frames 28. The rear frames 29 are interconnected by an upper cross member 31 disposed above a pivot shaft 30 by which the swing arm 20 is supported and a lower cross member C disposed below the pivot shaft 30. The lower cross member C has a lower projection D projecting downwardly from a substantially transverse central portion thereof. A rear suspension 42 has a lower end coupled to the lower projection D and a link support G mounted on a lower surface of the swing arm 20 by links E, F. A central frame 47 extends substantially vertically, is disposed in a substantially transverse central position and is disposed between the upper cross member 31 and the lower cross member C. The central frame H has an upper protrusion H disposed in an upper position near the upper cross member 31 and projects rearwardly with respect to the vehicle frame. The rear suspension 42 has an upper end coupled to the upper projection H.

The vehicle frame 11 also has a seat stay 32 extending rearwardly of the rear frames 29 and having a rear end extending along and mounted on the seat rail 22. The swing arm 20 and the upper cross member 31 are supported between a support 22a of the seat rail 22 and a support 32a of the seat stay 32 from a side view.

In the rear frames 29, a first space A1 is defined between the central frame 47 and the right rear frame 29. The drive shaft B is disposed in the first space A1. A second space A2 is defined between the central frame 47 and the left rear frame 29. The swing arm 20 has a front end pivotally supported in the second space A2 by the central frame 47 and the left rear frame 29. A ganged front and rear wheel control brake unit 50 has rear brake pipes 51, 52 disposed in the second space A2. The ganged front and rear wheel control brake unit 50 also has joints 53, 54 disposed above the second space A2.

A front brake lever 33 is attached to a right portion of the handle 14. The ganged front and rear wheel control brake unit 50 is connected to the front brake lever 33 and has a front brake master cylinder 55 mounted on the handle 14.

The power unit 16 composes a vertical V-shaped water-cooled four-stroke engine includes a crankcase 34 housing the transmission 18 therein. The power unit 16 is fixed to lower portions of the main frames 28 of the vehicle frame 11. An air cleaner (not shown) is mounted on an upper portion of the power unit 16 with a fuel tank 35 being disposed above the air cleaner. The engine 17 has cylinders 36 mounted on the crankcase 34 and includes intake ports (not shown) connected to an electronic fuel supply unit (not shown) and exhaust ports (not shown) that are connected to an exhaust pipe 37. The exhaust pipe 37 extends below the engine 17 and is connected to a main muffler 38. The output power from the transmission 18 is transmitted to the drive shaft B and then transmitted from the drive shaft B through the gears in the final drive gear case 39 to the rear wheel 21. The air cleaner may be supplied air or a ram air introduced from the front cowl 25 into the main frames 28.

The front fork 13 houses therein a front suspension 40 including a helical spring and a damper. The ganged front and rear wheel control brake unit 50 is connected to the front wheel 15 and has a pair of left and right front brake disks 56. Tandem brake calipers 57 for applying brake forces to the front brake disks 56 are mounted on the front fork 13. The brake calipers 57 have respective twin-port caliper cylinders 58.

The swing arm 20 is swingably coupled to the pivot shaft 30. External forces applied from the rear wheel 21 to the swing arm 20 are dampened by the rear suspension 42 which is coupled as a link between the swing arm 20 and the rear frames 29 and includes a helical spring and a damper. As with the front wheel 15, a rear brake disk 59 is mounted on the rear wheel 21, and a brake caliper 60 has twin-port caliper cylinders 61.

A rear brake pedal 43 which is angularly movable about a rear brake shaft 44 on its rear end is attached to the right main frame 28. The ganged front and rear wheel control brake unit 50 is connected to the rear brake pedal 43 and has a rear brake master cylinder 62 mounted on a side of the right main frame 28. The rear brake master cylinder 62 is connected to and held in fluid communication with a reservoir tank 63 which stores a brake fluid.

The ganged front and rear wheel control brake unit 50 has the reservoir tank 63, the rear brake master cylinder 62, a first brake pipe 64, a branch 65, a second brake pipe 66, a third brake pipe 67, a first actuator 68, a fourth brake pipe 69, a fifth brake pipe 70, a sixth brake pipe 71, a seventh brake pipe 72, a connector 73, an eighth brake pipe 74, a second actuator 75, a ninth brake pipe 76, a tenth brake pipe 77, the joints 53, 54, and the rear brake pipes 51, 52.

The first brake pipe 64 has an end connected to and held in fluid communication with the rear brake master cylinder 62 and another end connected to and held in fluid communication with the branch 65. The second brake pipe 66 has an end connected to and held in fluid communication with the branch 65 and another end connected to and held in fluid communication with the second actuator 75. The third brake pipe 67 has an end connected to and held in fluid communication with the branch 65 and another end connected to and held in fluid communication with the first actuator 68. The fourth brake pipe 69 has an end connected to and held in fluid communication with the first actuator 68 and another end connected to and held in fluid communication with to the left caliper cylinder 58.

The fifth brake pipe 70 and the sixth brake pipe 71 have ends connected to and held in fluid communication with the first actuator 68 and other ends connected to and held in fluid communication with the front right caliper cylinder 58. The seventh brake pipe 72 has an end connected to and held in fluid communication with the front left caliper cylinder 58 and another end connected to and held in fluid communication with the connector 73. The eighth brake pipe 74 has an end connected to and held in fluid communication with the connector 73 and another end connected to and held in fluid communication with the second actuator 75. The ninth brake pipe 76 and the tenth brake pipe 77 have ends connected to and held in fluid communication with the second actuator 75 and other ends connected to and held in fluid communication with the joint 53 and the joint 54, respectively. The brake pipes include flaring pipes of metal and tubular pipes of rubber, but are illustrated as identical pipes.

The ninth brake pipe 76 and the tenth brake pipe 77, which connect the first actuator 68 and the second actuator 75 for controlling the brakes and the rear caliper cylinders 61 to each other, and the rear brake pipes 51, 52, are disposed near the pivot shaft 30 of the swing arm 20 and extend between the upper cross member 31 and the swing arm 20. Therefore, the dead space between the upper cross member 31 and the swing arm 20 is effectively utilized. Thus, the long pipes can be supported at few locations and bent pipe portions can be shortened as much as possible.

The ganged front and rear wheel control brake unit 50 operates as follows. When the front brake lever 33 is gripped, a pressure buildup is developed in the front master cylinder 55. The brake fluid flows under the pressure buildup through the seventh brake pipe 72 to the front left caliper cylinder 58, and flows through the fourth brake pipe 69, the first actuator 68, and the fifth brake pipe 70 to the front right caliper cylinder 58, thereby braking the front wheel 15. At the same time, the brake fluid flows through the eighth brake pipe 74, the second actuator 75, the ninth brake pipe 76, the joint 53, and the rear brake pipe 51 to the rear caliper cylinders 61 under a pressure lower than the brake fluid pressure applied to the front caliper cylinders 58.

When the rear brake pedal 43 is pressed, a pressure buildup is developed in the rear master cylinder 62. The brake fluid flows under the pressure buildup through the first brake pipe 64, the branch 65, the second brake pipe 66, the second actuator 75, the tenth brake pipe 77, the joint 54, and the rear brake pipe 52 to the rear caliper cylinders 61, thereby braking the rear wheel 21. At the same time, the brake fluid flows through the branch 65, the third brake pipe 67, the first actuator 68, the sixth brake pipe 71, and the fourth brake pipe 69 to the front caliper cylinders 58 under a pressure lower than the brake fluid pressure applied to the rear caliper cylinders 61.

Consequently, the braking force applied to the front wheel 15 and the braking force applied to the rear wheel 21 are balanced to brake them while minimizing changes in the vehicle attitude.

Figure 4:
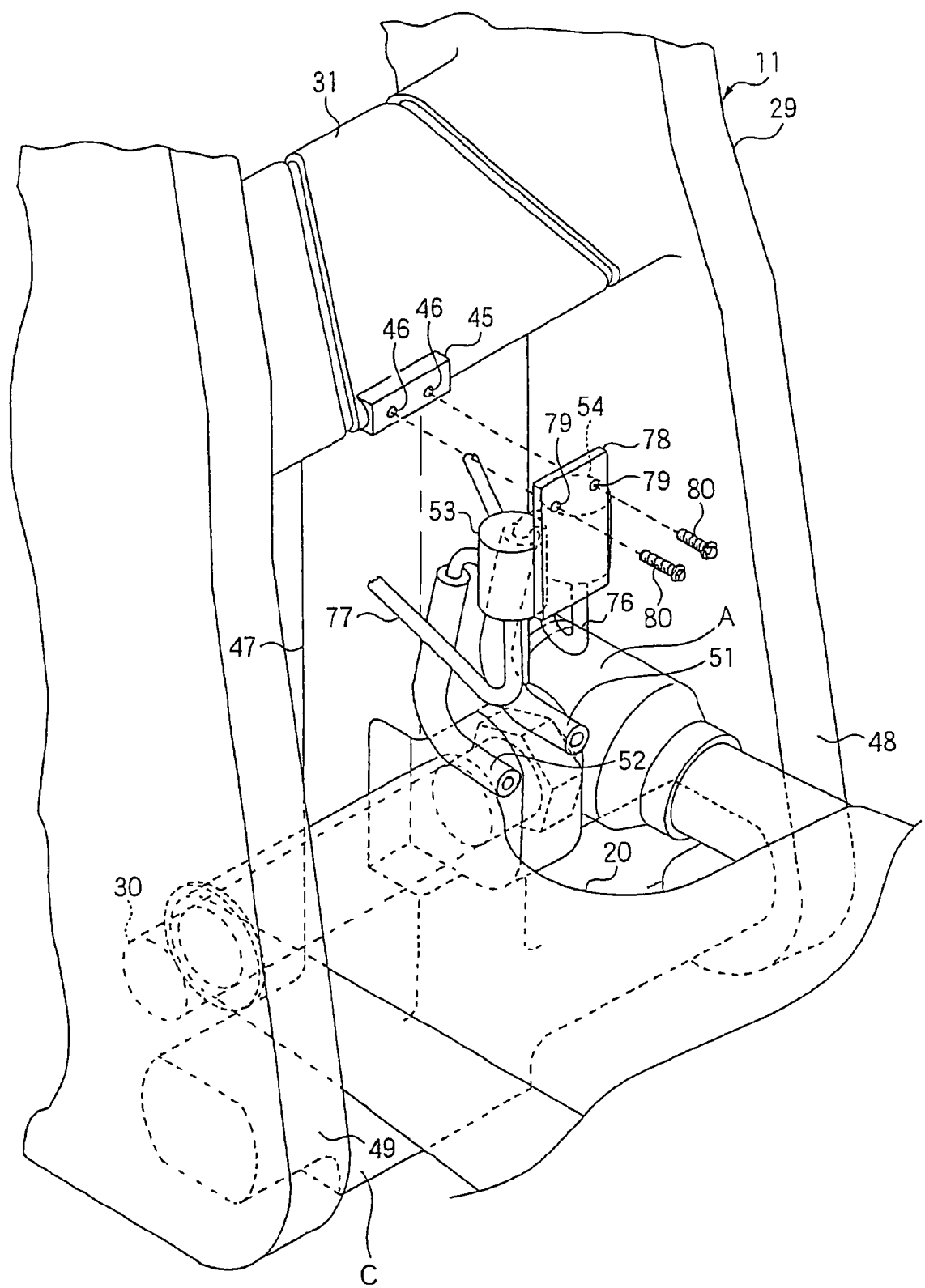
FIG. 4 is a perspective view of an essential portion of the brake support structure shown in FIG. 1, around a cross member before a connecting member is mounted.

As shown in FIG. 4, the upper cross member 31 has a trapezoidal brake pipe attachment 45 on a rear left portion thereof. The brake pipe attachment 45 has two screw holes 46. A plate-like brake pipe support member 78 is integrally fixed to rear portions of the joints 53, 54 and has two screw holes 79.

Figure 5:
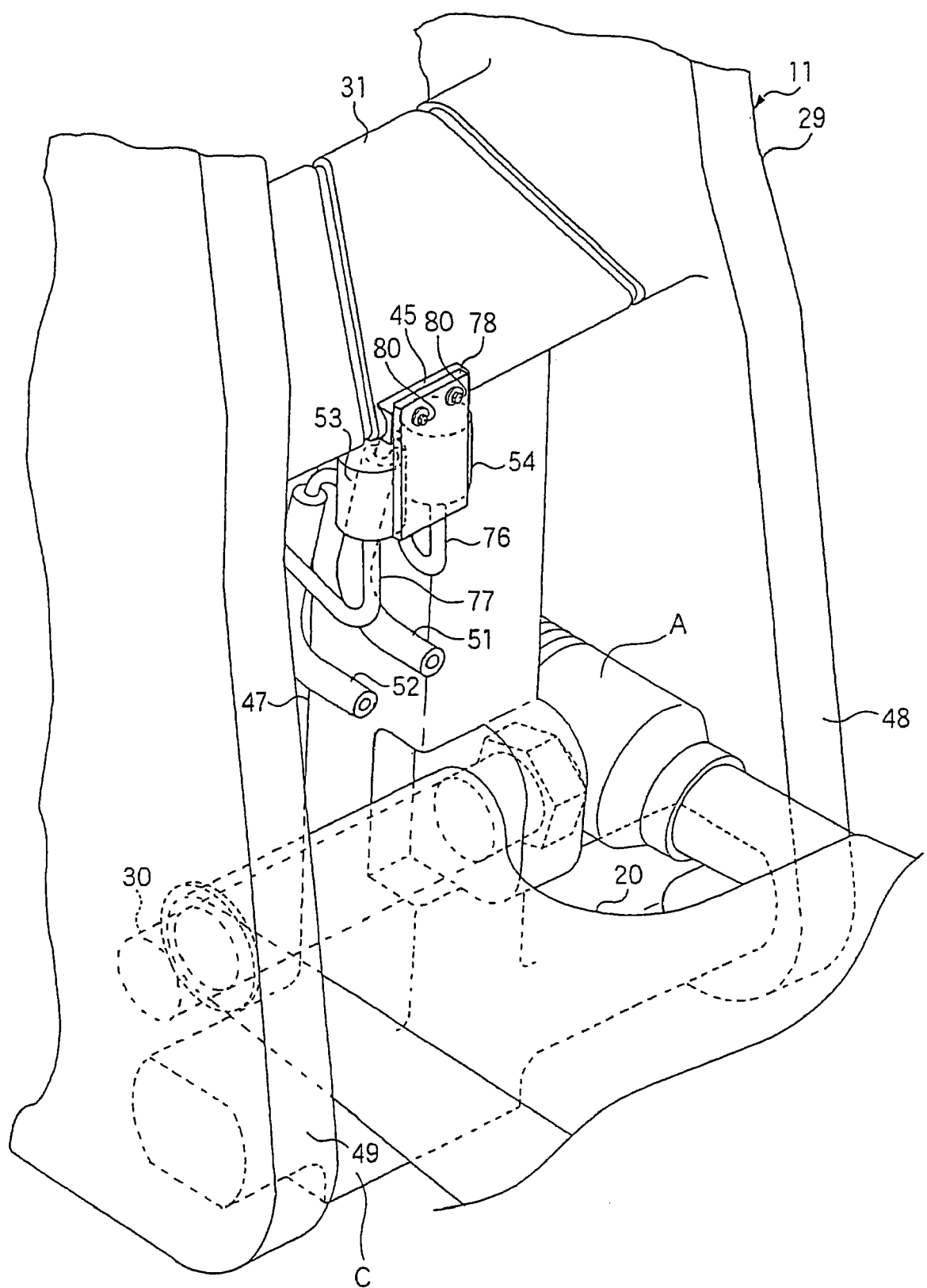
FIG. 5 is a perspective view of the essential portion shown in FIG. 4 around the cross member after the connecting member is mounted.

As shown in FIG. 5, the brake pipe support member 78 with the joints 53, 54 secured thereto is fixed to the upper cross member 31 by bolts 80 inserted through the screw holes 79 and threaded into the screw holes 46 defined in the brake pipe attachment 45 of the upper cross member 31. Therefore, the rear brake pipes 51, 52, the joints 53, 54, the ninth brake pipe 76, and the tenth brake pipe 77 are supported forwardly of the brake pipe support member 78, and the brake pipes 51, 52, 76, 77 and the joints 53, 54 are prevented from projecting rearwardly. The brake pipe support member 78 may be fixed by a single bolt.

Figure 6:
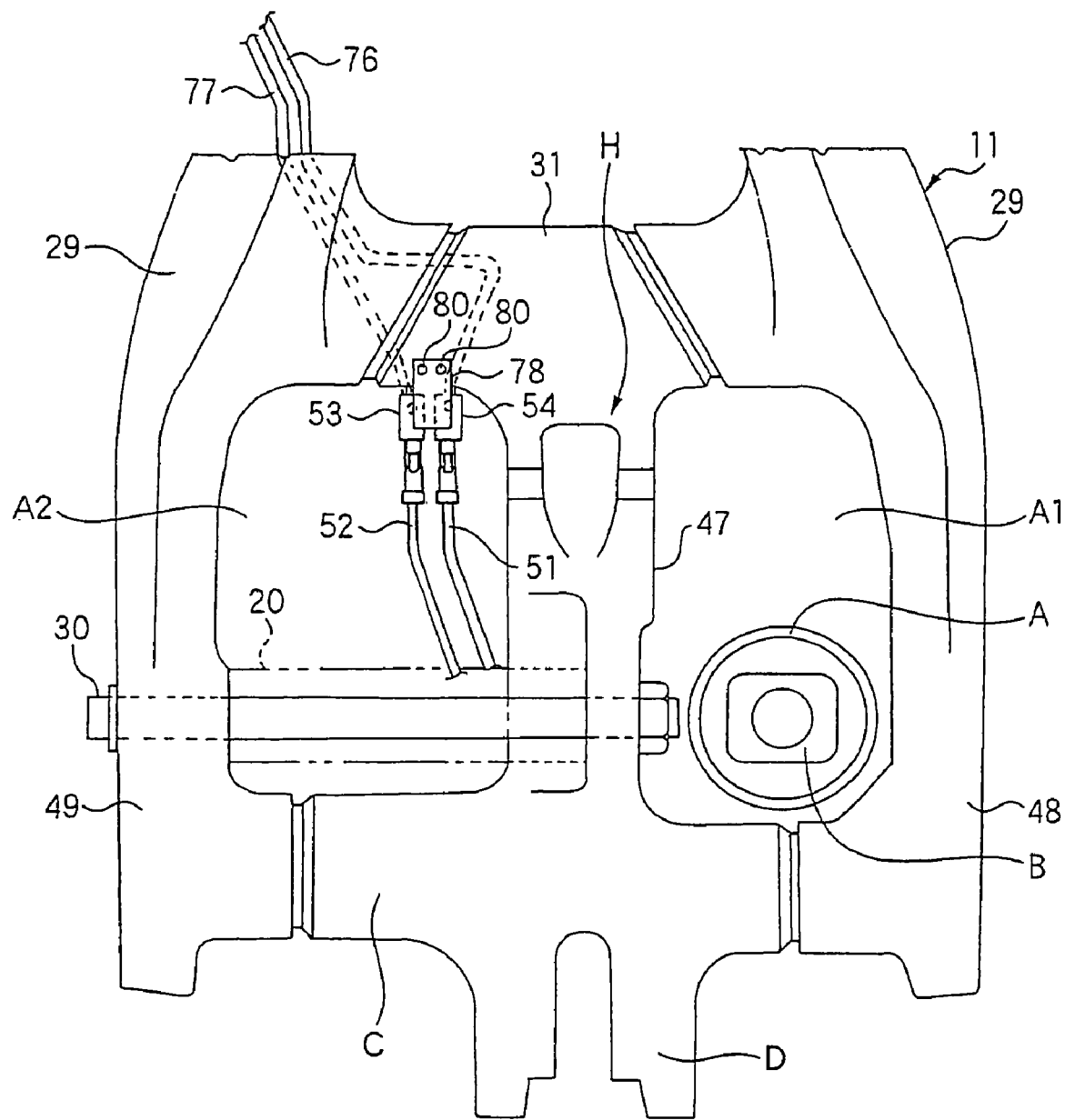
FIG. 6 is a rear view of the cross member shown in FIG. 5.

As shown in FIG. 6, the rear frames 29 have the central frame 47 disposed centrally of the vehicle frame and side frames 48, 49 disposed in sandwiching relation to the central frame 47. The first space Al is defined between the right side frame 48 and the central frame 47, and the second space A2 is defined between the left side frame 49 and the central frame 47. The cross member 31 interconnects the side frames 48, 49 of the rear frames 29, and the brake pipe support member 78 is fixed to the rear portion of the upper cross member 31. Therefore, the ninth brake pipe 76 and the tenth brake pipe 77 extend across the upper cross member 31 and forwardly from the joints 53, 54. The rear brake pipes 51, 52 extend forwardly and then extend rearwardly at a position below the upper cross member 31. The joints 53, 54 are disposed below the upper cross member 31. Consequently, the joints 53, 54, the rear brake pipes 51, 52, the ninth brake pipe 76, and the tenth brake pipe 77 are prevented from projecting rearwardly.

As described above, the upper cross member 31 which interconnect the rear frames 29 is disposed near the swing arm 20, and the rear brake pipes 51, 52, the ninth brake pipe 76, and the tenth brake pipe 77 extend through the joints 53, 54 between the upper cross member 31 and the swing arm 20. The vehicle frame 11 interconnects the seat rail 22 extending from rear upper portion thereof and the seat stay 32 extending rearwardly from the rear lower portion of the vehicle frame 11. The upper cross member 31 and the swing arm 20 are disposed between the seat rail 22 and the seat stay 32. The rear brake pipes 51, 52, the joints 53, 54, the ninth brake pipe 76, and the tenth brake pipe 77 are supported on the upper cross member 31.

The rear frames 29 have the central frame 47 disposed centrally of the vehicle frame and the side frames 48, 49 disposed in a sandwiching relation to the central frame 47. A drive force transmitting unit 19 for transmitting the drive force from the engine 17 to the rear wheel 21 is disposed in the first space Al that is defined between the side frame 48 and the central frame 47, and the front end of the swing arm 20 is pivotally supported in the second space A2 that is defined between the side frame 49 and the central frame 47. Furthermore, the rear brake pipes 51, 52, the joints 53, 54, the ninth brake pipe 76, and the tenth brake pipe 77 are disposed. The brake pipe support member 78 is fixed to the joints 53, 54, and is supported on the rear portion of the upper cross member 31.

With the above brake support structure, the upper cross member 31 interconnecting the rear frames 29 is disposed near the swing arm 20. The rear brake pipes 51, 52, connected to the brake caliper 60 for braking the rear wheel 21, the joints 53, 54, and the ninth and tenth brake pipes 76, 77, are disposed between the upper cross member 31 and the swing arm 20. Therefore, the dead space between the upper cross member 31 and the swing arm 20 is effectively utilized, allowing the brake piping to be easily placed around the pivot shaft 30 and to have a layout for a neat appearance and piping protection. The brake support structure is advantageous as to cost and weight because there is no need for the installation of the separate pipe stay as was required in the past.

Furthermore, with the above brake support structure, since the upper cross member 31 and the swing arm 20 can be positioned closely to each other, brackets for supporting the brake pipes are not required to be large in size. Therefore, the brake support structure is advantageous as to cost and allows the vehicle to be lightweight as a whole.

In addition, with the above brake support structure a drive force transmitting unit, such as the drive shaft B, is disposed in the first space A1 between one of the side frames 48, 49 and the central frame 47, and the rear brake pipes 51, 52, the joints 53, 54, and the ninth and tenth brake pipes 76, 77 are disposed in the second space A2 between the other of the side frames 48, 49 and the central frame 47. Consequently, the rear brake pipes 51, 52, the joints 53, 54, and the ninth and tenth brake pipes 76, 77 can be fixed in place in the space opposite to the drive force transmitting unit 19. These pipes can thus be fixed with ease.

Moreover, with the above brake support structure, inasmuch as the process of supporting the brake pipe support member 78 on the upper cross member 31 is performed in the space opposite to the engine 17, the process can be carried out without physical interference with accessories mounted on the engine 17.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brake support structure comprising:
   a vehicle frame including main frames extending rearwardly and downwardly from a head pipe and a plurality of rear frames extending from the main frames;
   a swing arm having a front end pivotally supported on said rear frames and a rear end for rotatably supporting a rear wheel; and
   brake pipes connected to a brake caliper for braking said rear wheel;
   wherein a cross member interconnecting said rear frames is disposed near said swing arm,
   said brake pipes extend between said cross member and said swing arm, and
   wherein a brake pipe support member is provided on said brake pipes, said brake pipe support member being supported on a rear portion of said cross member, and said brake pipes being supported forwardly of said brake pipe support member.

2. The brake support structure according to claim 1, wherein a seat rail extending from a rear upper portion of said vehicle frame and a seat stay extending rearwardly from a rear lower portion of said vehicle frame are connected to said vehicle frame;
   said cross member and said swing arm being disposed between said seat rail and said seat stay; and
   said brake pipes are supported on said cross member.

3. The brake support structure according to claim 1, wherein said rear frames have a central frame disposed centrally of the vehicle frame and side frames disposed in a sandwiching relation to said central frame;
   a drive force transmitting unit, for transmitting the drive force from an engine to said rear wheel, is disposed in a first space defined between one of said side frames and said central frame; and
   said swing arm includes a front end pivotally supported in a second space defined between the other of said side frames and said central frame, and said brake pipes are disposed in said second space.

4. The brake support structure according to claim 3, wherein a brake pipe support member is provided on said brake pipes, said brake pipe support member being supported on a rear portion of said cross member, and said brake pipes being supported forwardly of said brake pipe support member.

5. The brake support structure according to claim 2, wherein said rear frames have a central frame disposed centrally of the vehicle frame and side frames disposed in a sandwiching relation to said central frame;
   a drive force transmitting unit, for transmitting the drive force from an engine to said rear wheel, is disposed in a first space defined between one of said side frames and said central frame; and
   said swing arm includes a front end pivotally supported in a second space defined between the other of said side frames and said central frame, and said brake pipes are disposed in said second space.

6. The brake support structure according to claim 5, wherein a brake pipe support member is provided on said brake pipes, said brake pipe support member being supported on a rear portion of said cross member, and said brake pipes being supported forwardly of said brake pipe support member.

7. The brake support structure according to claim 2, wherein a brake pipe support member is provided on said brake pipes, said brake pipe support member being supported on a rear portion of said cross member, and said brake pipes being supported forwardly of said brake pipe support member.

8. The brake support structure according to claim 1, wherein the brake pipe support member is mounted on said cross member with at least one securing member and further including joints for said brake pipes with said joints being supported to a forward side of said brake pipe support member.

9. The brake support structure according to claim 1, wherein the rear frames includes a right rear frame, a left rear frame and a central frame extending therebetween, a first space being formed between at least one of the right rear frame and the left rear frame and the central frame for enabling a power drive force to extend from an engine to said rear wheel and a second space being formed between at least one of the left rear frame and the right rear frame and the central frame for enabling the brake pipes to extend therethrough.

10. A brake support structure comprising:
    a vehicle frame supporting a single front wheel and a single rear wheel, the vehicle frame comprising rear frames;
    a swing arm having a front end pivotally supported on the vehicle frame and a rear end for rotatably supporting the rear wheel;
    brake pipes operatively connected to a brake caliper for braking said rear wheel; and a cross member interconnecting the rear frames of the vehicle, said cross member being disposed adjacent to the front end of said swing arm, wherein said brake pipes extend between said cross member and said swing arm, and wherein a brake pipe support member is provided on said brake pipes, said brake pipe support member being supported on a rear portion of said cross member, and said brake pipes being supported forwardly of said brake pipe support member.

11. The brake support structure for use with a vehicle frame according to claim 10, wherein a seat rail extending from a rear upper portion of said vehicle frame and a seat stay extending rearwardly from a rear lower portion of said vehicle frame are connected to said vehicle frame;

said cross member and said swing arm being disposed between said seat rail and said seat stay; and said brake pipes are supported on said cross member.

12. The brake support structure for use with a vehicle frame according to claim 11, wherein said rear frames have a central frame disposed centrally of the vehicle frame and side frames disposed in a sandwiching relation to said central frame;

a drive force transmitting unit, for transmitting the drive force from an engine to said rear wheel, is disposed in a first space defined between one of said side frames and said central frame; and said swing arm includes a front end pivotally supported in a second space defined between the other of said side frames and said central frame, and said brake pipes are disposed in said second space.

13. The brake support structure for use with a vehicle frame according to claim 12, wherein a brake pipe support member is provided on said brake pipes, said brake pipe support member being supported on a rear portion of said cross member, and said brake pipes being supported forwardly of said brake pipe support member.

14. The brake support structure for use with a vehicle frame according to claim 11, wherein a brake pipe support member is provided on said brake pipes, said brake pipe support member being supported on a rear portion of said cross member, and said brake pipes being supported forwardly of said brake pipe support member.

15. The brake support structure for use with a vehicle frame according to claim 10, wherein said rear frames have a central frame disposed centrally of the vehicle frame and side frames disposed in a sandwiching relation to said central frame;

a drive force transmitting unit, for transmitting the drive force from an engine to said rear wheel, is disposed in a first space defined between one of said side frames and said central frame; and said swing arm includes a front end pivotally supported in a second space defined between the other of said side frames and said central frame, and said brake pipes are disposed in said second space.

16. The brake support structure for use with a vehicle frame according to claim 15, wherein a brake pipe support member is provided on said brake pipes, said brake pipe support member being supported on a rear portion of said cross member, and said brake pipes being supported forwardly of said brake pipe support member.

17. The brake support structure for use with a vehicle frame according to claim 10, wherein the brake pipe support member is mounted on said cross member with at least one securing member and further including joints for said brake pipes with said joints being supported to a forward side of said brake pipe support member.

18. The brake support structure for use with a vehicle frame according to claim 10, wherein the rear frame includes a right rear frame, a left rear frame and a central frame extending therebetween, a first space being formed between at least one of the right rear frame and the left rear frame and the central frame for enabling a power drive force to extend from an engine to said rear wheel and a second space being formed between at least one of the left rear frame and the right rear frame and the central frame for enabling the brake pipes to extend therethrough.

\* \* \* \* \*